Figure 1:
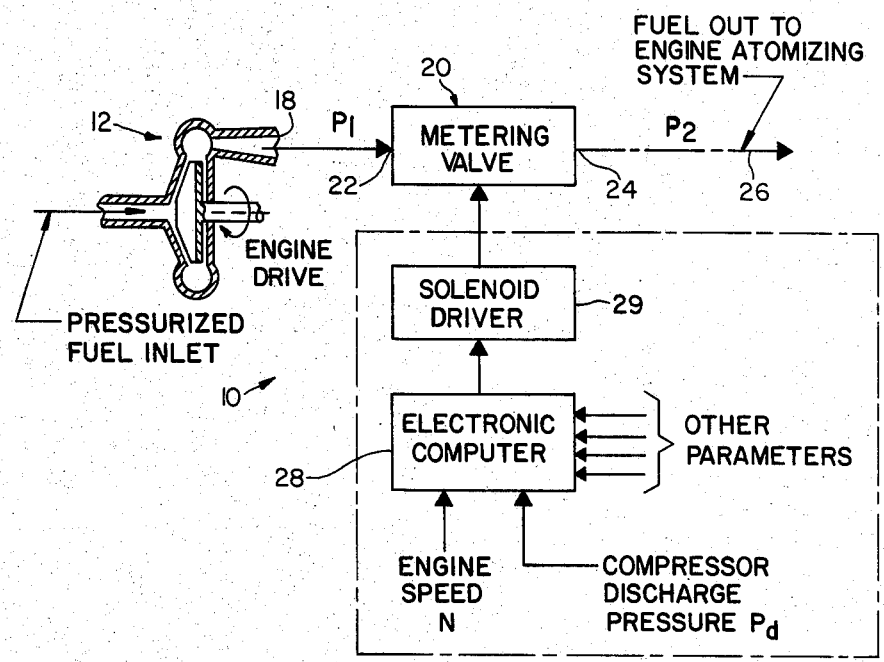

United States Patent [19]

Eastman

[11] Patent Number: 4,640,093
[45] Date of Patent: Feb. 3, 1987

[54] FUEL METERING SYSTEM

[75] Inventor: James M. Eastman, South Bend, Ind.

[73] Assignee: Allied Corporation, Morristown, N.J.

[21] Appl. No.: 771,756

[22] Filed: Sep. 3, 1985

[51] Int. Cl.[4] .............................................. F02C 9/26
[52] U.S. Cl. ............................... 60/39.281; 251/30.02; 251/129.05
[58] Field of Search ................... 60/39.281; 251/30.01, 251/30.02, 30.03, 44, 45, 129.05

[56] References Cited

U.S. PATENT DOCUMENTS

| | | | |
|---|---|---|---|
| 3,006,144 | 10/1961 | Arnett et al. | 60/39.281 |
| 3,282,556 | 11/1966 | Hancook | 251/30.02 |
| 3,292,367 | 12/1966 | Bauger et al. | 60/39.141 |
| 3,688,495 | 9/1972 | Fehler et al. | 60/39.281 |
| 4,015,426 | 4/1977 | Hobo et al. | 60/39.281 |
| 4,099,701 | 7/1978 | Berger | 251/45 |
| 4,454,713 | 6/1984 | Meyer et al. | 60/39.281 |

Primary Examiner—Louis J. Casaregola
Attorney, Agent, or Firm—Leo H. McCormick, Jr.; Ken C. Decker

[57] ABSTRACT

A metering valve (20) for supplying a turbine engine with a fuel at a substantially constant flow rate in response to operational conditions evaluated by a computer (28). A signal from the computer (28) in the form of voltage pulses is supplied to a solenoid (30). The solenoid (30) regulates the flow of fuel from a control chamber (54) to produce a fuel pressure $P_x$ therein. The fuel enters a supply chamber (46) and the fuel pressure $P_1$ thereof acts on the effective area of a first diaphragm (42) to move face (70) on plunger (68) away from seat (38) in opposition to a closing force generated by the fluid pressure $P_x$ acting on a second diaphragm (48). A feedback valve (90) regulates the flow of fuel from supply chamber (46) to control chamber (54). By making the size of the first diaphragm (42) one half the size of the second diaphragm (48) when $P_x$ is equal to one half of the sum of fuel pressures $P_1$ and $P_2$, an equilibrium condition exists and fuel is supplied to the outlet conduit (40) at a substantially constant rate for distribution to a turbine engine.

9 Claims, 2 Drawing Figures

FUEL METERING SYSTEM

This invention relates to a metering valve for use in a control system that supplies a gas turbine engine with fuel in response to an operational signal.

Traditional fuel metering systems for gas turbine engines embody a metering valve, a head regulator to maintain a constant differential pressure across the metering valve and a shut-off valve. In order to achieve a minimal cost, the aforementioned components generally operate at low force levels. Operation at low force levels has the drawback of fostering hysteresis owing to contaminants becoming interposed between moving parts and close fits between the parts themselves.

The utilization of high frequency, time modulated valves for metering fuel has been developed for use in both automobiles and aircraft. In the pulse width modulated fuel metering system disclosed in U.S. Pat. No. 4,454,713 issued June 19, 1984, a solenoid is cycled to repeatedly move a ball off a seat to provide a turbine with fuel. Since the ball valve supplies all of the fuel to the turbine, the operation thereof is characterized by pronounced compressor pressure fluctuation.

The metering valve of the present invention discloses a first and second stage valve arrangement where a portion of the supply fuel having a pressure ($P_1$) is directed through a feedback valve to a control chamber having a pressure ($P_x$), which is normally midway between ($P_1$) and the discharge pressure ($P_2$). A computer which receives inputs relating to the operation of the turbine, air speed, temperature, pressure and other operating parameter, derives a pulsing signal corresponding to a desired operation for the turbine. The pulse signals activate an electronic device operates the first stage valve. The first stage valve exhausts fuel from the control chamber to discharge pressure ($P_2$) to vary ($P_x$). Variation in the control pressure ($P_x$) moves the larger second stage valve to which the feedback valve is attached, until the latter valve restores ($P_x$) to its equilibrium valve, with the second stage valve in a new position. The second stage valve has a metering pressure drop ($P_1 - P_2$) and supplies the major portion of the metered fuel. Since only a small portion of the total metered flow passes through the pulsing first stage valve, net metered flow is substantially steady.

In the absence of an operational signal from the computer, the electronic device is inactivated, the first stage valve remains closed, and the fluid pressure ($P_x$) in the control chamber increases to the fluid pressure ($P_1$) of the supply fuel. Since the effective area exposed to ($P_x$) in the control chamber is larger than the effective area exposed to the supply fuel ($P_1$), the second stage valve moves closed to interrupt the flow of fuel to the outlet conduit.

In order to assure that the second stage valve remains on its seat when there is no operating pressure differential ($P_1 - P_2$), a spring in the control chamber urges the valve against the seat. Thus, except when the turbine needs fuel, as evidenced by an operating fuel pressure differential ($P_1 - P_2$) and by the pulse signals form the computer, fuel is prevented from flowing to the turbine.

It is an object of this invention to provide a turbine engine with a fuel metering system having a pulse width modulated control device responsive to a computer operational signal for developing an essentially steady flow of fuel to operate a turbine engine.

It is a further object of this invention to control fuel flow with the simplest least expensive electrohydraulic means—a single simple solenoid valve.

An advantage of this fuel supply system is the use of a small pulse width modulated valve to control the flow of a small quantity of fuel from a supply chamber to an outlet conduit for developing a control pressure which in turn operates a larger metering valve through which most of the fuel flows more steadily from the supply chamber into the outlet conduit, thereby minimizing electrical power consumption and the size, weight, and cost of the pulse width modulated valve.

Figure 2:
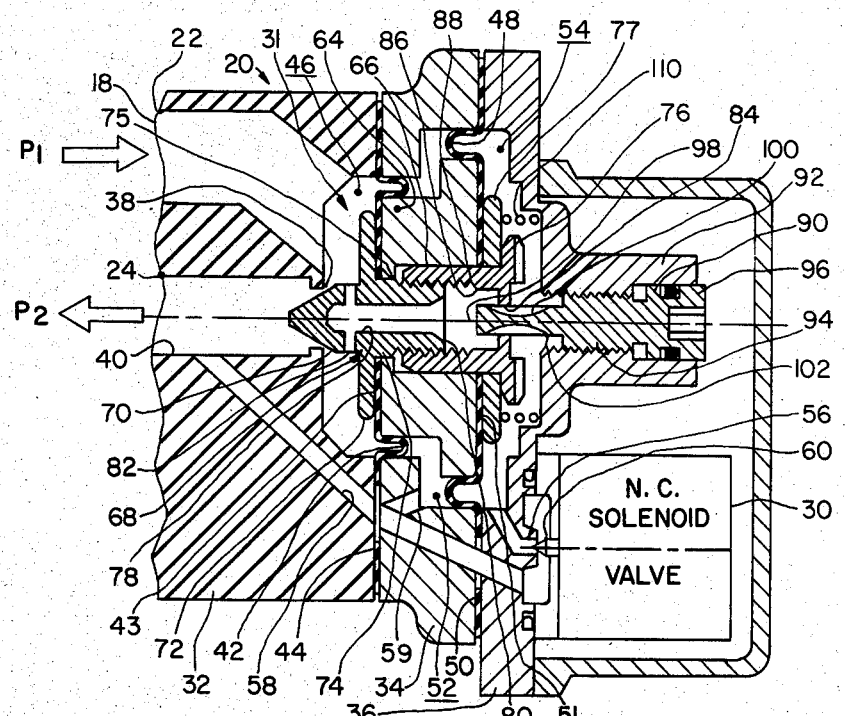

These objects and advantages should be apparent from reading this specification while viewing the drawings wherein:

FIG. 1 is a schematic illustration of a fuel metering system made according to the invention; and FIG. 2 is a sectional view of the metering valve illustrated in FIG. 1.

The fuel supply system 10 shown in FIG. 1 has a pump 12 which is driven to supply fuel under pressure ($P_1$) to the metering valve 20. The discharge conduit 18 from the pump 12 is connected to the inlet port 22 in the metering valve 20.

The outlet port 24 of the metering valve 20 is connected to supply conduit 26 that supplies the turbine engine with fuel at pressure ($P_2$).

The flow of fuel to the engine is controlled by a computer 28 which receives various inputs relating to temperature, pressure, altitude, speed, desired speed, ect. to generate an operational signal. This operational signal is amplified with a solenoid driver 29 and represented as voltage pulses that are applied to a normally closed solenoid valve 30 in the metering valve 20.

The solenoid valve 30 is a standard commercial product sold by the General Valve Corporation (East Hanover, N.J.). The solenoid valve 30 is designed to be either on or off and the cycling thereof corresponds to the signal supplied by the computer 28. The solenoid valve 30 acts as a control or first stage valve for the main or second stage valve 31 in the metering valve 20 as shown in FIG. 2.

The metering valve 20 has a housing made up of a head member 32, a central member 34 and an end member 36. The head member 32 contains the inlet port 22 and the outlet port 24. An outlet conduit 40 connects the outlet port 24 with an annular valve seat 38. A first diaphragm 42 has a flange or bead 44 which is held between the head member 32 and central member 34 to define the limits of a first or supply chamber 46.

A second diaphragm 48 has a flange or bead 50 which is held between the central member 32 and an end member 36 to define the limits of an intermediate chamber 52 and a control chamber 54.

A control port 56 connects the control chamber 54 with the outlet conduit 40 by way of a conduit 58.

As illustrated in FIG. 2, plunger 60 of the solenoid or first stage valve 30 moves with respect to control port 56 to control the flow of fluid between the control chamber 54 and the outlet conduit 40 while the second stage or main valve 31 moves to control the flow of fuel directly from the supply chamber 46 past seat 38 to the outlet conduit 40.

The second stage or main valve 31 has a spool 64 located in intermediate chamber 52 and with a bore 66 therethrough. A valve 68 has a contoured head 70 thereon. An annular shoulder 72 radiates from a stem section 74 that extends into bore 66. The stem section 74 has threads 75 to receive an end cap member 76 that also extends into bore 66 of the spool 64. The stem section 74 has a bore 78 that extends from end 80 to a cross bore 82 adjacent annular shoulder 72. End cap member 76 has a central valve orifice 84 that connects bore 86 therein, which extends from bore 78, with the control chamber 54. When the threads 88 on end cap member 76 are mated with threads 75 on valve 68, washer 77 acts on the inner flange or bead 51 of diaphragm 48 and shoulder 72 acts on the inner flange or bead 43 of diaphragm 42 to establish seals between the first or supply chamber 46, the second or intermediate chamber 52, and the third or control chamber 54.

A feedback valve 90 located in a projection 92 of the end plate 36 has a stem 94 whose position is adjustable by turning the head 96. The end 98 of the stem 94 has a series of contoured surfaces 100, 102 whose space relationship with valve orifice 84 controls the flow of fuel between the supply chamber 46 and control chamber 54 by way of bores 78 and 86.

In order to find the equilibrium relationship which would position contour 70 on valve 68, the following forces can be calculated as acting on the first and second diaphragms 42 and 48:

$$P_1A_1 + P_2A_2 = P_2A_1 + P_xA_2 \qquad \text{Equation (1)}$$

where:

$P_1$ = pressure of the supply fuel in chamber 46
$P_2$ = pressure of discharge fuel in the output conduit 40 and intermediate chamber 52
$P_x$ = control pressure on chamber 54
$A_1$ = Effective Area of diaphragm 42
$A_2$ = Effective Area of diaphragm 48

Factoring and rearranging Equation (1), and selecting $A_1$ to be $1/2 A_2$, reduces it to Equation (2):

$$P_x = (P_1 + P_2)/$$

Thus, equilibrium exists for the main valve 31 when the control pressure $P_x$ is equal to the average of the inlet $P_1$ and outlet $P_2$ pressure of the fuel.

The fuel metering valve 20 operates in the following manner: Fuel from the supply source is delivered to pump 12 which increases the pressure thereof to $P_1$. This fuel having a pressure $P_1$ is carried through conduit 18 to the inlet port 22 and supply chamber 46. Fuel in the supply chamber 46 is communicated through cross bore 82 into bore 78 and extension 86 to valve orifice 84 to the control chamber 54. The contours 100 and 102 on stem 94 are such that even though spring 110 urges valve contour 70 into engagement with seat 38, fluid communication exists through opening 84. When solenoid 30 is off, the fluid pressure in the control chamber 54 is thus equal to $P_1$. With fluid pressure $P_1$ acting on diaphragm 48, there is twice as much force acting on diaphragm 48 and spool 64 to move valve 68 toward seat 38 as there is acting on diaphragm 42 and spool 64 to move valve 68 away from the seat 38.

When an electrical power is supplied to the computer 28, an operational signal is generated which represents various operational parameters, such as temperature, altitude, pressure, desired engine speed, ect. This operational signal is transmitted to the solenoid 30 via solenoid driver 29 as a voltage which periodically energizes the solenoid for set intervals of time or pulse widths. When solenoid 30 is energized, plunger 60 moves away from control port 56 to allow fuel to flow from the control chamber 54 to the outlet conduit 40 by way of the conduit 58. The time integrated effective average flow area through control port 56 is essentially proportional to the pulse width modulation ratio: i.e., the ratio of the solenoid energizing intervals to the period between successive energizations. As fuel flows from the control chamber 54, the fluid pressure therein decreases. When the fluid pressure ($P_x$) in the control chamber 54 decreases to a valve less than the average of fluid pressures $P_1$ and $P_2$, a net opening force develops which overcomes spring 110 and moves valve 68 to allow fluid to flow from chamber 46 past seat 38 directly into the outlet conduit 40 for distribution to the turbine engine through conduit 26. The pulsing frequency is high enough that valve 68 responds essentially to only the average opening of solenoid valve plunger 60.

As valve 68 moves open, valve orifice 84, which is attached to it, also moves relative to contoured surfces 100 and 102 of stationary feedback valve 90, such that flow from the supply pressure $P_1$ chamber 46 to the control pressure $P_x$ chamber 54 increases. When this (feedback) flow becomes equal to the average (pilot) flow through solenoid valve control port 56, further movement of valve 68 an valve orifice 84 is arrested, the net opening force drops to zero, and force equilibrium is re-established with $P_x$ equal to the average of $P_1$ and $P_2$. At this point in time the movement of valve 68 and the metered fuel flow through valve seat 38 will be essentially proportional to the average solenoid valve flow, i.e., the pulse width modulation ratio. Net metered flow will be equal to the sum of the nearly constant flow through valve seat 38 and the smaller pulsing pilot flow through the solenoid valve. Subsequent changes in modulation ratio will produce equivalent changes in net metered fuel flow. The flow of fuel past seat 38 is controlled by contour 70 on valve 68 and by valve pressure drop $P_1 - P_2$.

The pulsing nature of the flow of pilot fuel from the control chamber 54 through the control port 56 into conduit 58 and outlet conduit 40 has little effect on the net flow characteristics of the fuel supplied to the turbine engine 26. The relative size of the feedback control port 56 as compared to valve seat 38 and the short high frequency solenoid voltage pulses signalled by the computer 28 are such that the small ripple in metered fuel flow has no significant effect on engine operation.

When the computer 28 evaluates the operational parameters and determines that a different fuel flow is required to operate the turbine engine, the width of the input voltage pulses to solenoid 30 are modified to reflect the operational change. This change is reflected in corresponding longer or shorter time periods that fuel can flow through the control port 56. The average flow of fuel through the control port 56 correspondingly changes the fuel pressure $P_x$ in the control chamber 54. As a result of the change in fuel pressure $P_x$, the changed pressure differential across the second diaphragm 48 moves feedback valve orifice 84 with respect to valve 90 and valve contour 70 with respect to seat 38 to restore pressure equilibrium at a different fuel flow rate.

Thus, the fuel flow to the turbine engine is metered substantially in accordance with the operational requirement as determined by the computer 28.

I claim:

1. A metering valve for supplying fuel to a turbine engine in response to an operational signal, said metering valve comprising:

a housing having a cavity therein with an inlet port, a control port, and an outlet port, said inlet port being separated from said outlet port by a first annular seat, said first annular seat being connected to said outlet port by an outlet conduit, said control port being connected to said outlet conduit by a by pass conduit;

wall means for separating said cavity into first, second and third chambers, said first chamber being connected to said inlet port for receiving fuel having a fluid pressure $P_1$, said second chamber being connected to said outlet conduit, said third chamber being connected to said first chamber and said control port;

a plunger connected to said wall means having a face therein that moves with respect to said first annular seat to regulate the flow of fuel from said first chamber into said outlet conduit, said fuel in said outlet conduit having a fluid pressure $P_2$;

feedback valve means connected to said wall means for controlling the fuel flow from said first chamber to said third chamber; and electrohydraulic means responsive to said operational signal for rapidly pulsing fuel flow from said third chamber to said by pass conduit to develop a fluid pressure $P_x$ in said third chamber, said fluid pressure $P_1$ in said first chamber and fluid pressure $P_2$ in said second chamber and fluid pressure $P_x$ is said third chamber positioning said wall means such that substantially a steady flow of fuel is metered from said first chamber through said first seat into said outlet conduit, said pulsing fuel flow from said third chamber being parallel with and substantially smaller than said steady flow from said first chamber.

2. The metering valve as recited in claim 1 wherein said wall means includes:

a spool member having a bore therethrough for connecting said first chamber with said third chamber, said spool member having a first diameter and a second diameter which define first and second areas on said wall means, said first and second diameter being selected such that equilibrium occurs when the fuel pressure $P_x$ is about one half of the sum of the fuel pressure $P_1$ and $P_2$.

3. The metering valve as recited in claim 2 wherein said feedback valve includes:

flow control means for providing a minimum fuel connection between said first and third chambers, said fluid pressure $P_x$ in said third chamber being equal to the fluid pressure $P_1$ in said first chamber in the absence of an operating signal and acting on said wall means by moving said face into contact with said first seat to interrupt fluid communication from said first chamber to said outlet conduit.

4. The metering valve as recited in claim 3 wherein said feedback valve means further includes:

resilient means located in said third chamber for urging said wall means toward said first chamber, said resilient means urging said face on said plunger toward said first seat in the absence of said operational signal to assure that teh fluid interruption occurs between the first chamber and the outlet conduit.

5. The metering valve as recited in claim 4 wherein said wall means includes:

a first diaphragm connected to said spool and housing for separating said first and second chamber; and a second diaphragm connected to said spool and housing for separating said second and third chambers, said first and second diaphragms allowing said spool member to freely move within said housing in response to changes in the fluid pressures in the first, second and third chambers.

6. A metering valve as in claim 5 wherein said electrohydraulic means comprises a normally closed spring loaded solenoid valve.

7. A metering valve as in claim 6 wherein said operational signal consists of electrical voltage pulses generated by amplifying low power signals derived from a digital electronic computer.

8. In the metering valve as recited in claim 1 wherein said pulsing fuel flow is added to said steady flow in said outlet conduit for distribution to said turbine engine.

9. In the metering valve as recited in claim 6 wherein the time integrated effective average flow through the control port from said third chamber is proportional to the ratio of the energizing internals to the time period between successive energizations of said solenoid valve.

* * * * *